United States Patent [19]

Yamada et al.

[11] Patent Number: 4,796,961
[45] Date of Patent: Jan. 10, 1989

[54] MULTI-BEAM SCANNING OPTICAL SYSTEM

[75] Inventors: Kunio Yamada; Masao Ito, both of Kanagawa, Japan

[73] Assignee: Fuji Xerox Co., Ltd., Tokyo, Japan

[21] Appl. No.: 55,042

[22] Filed: May 28, 1987

[30] Foreign Application Priority Data

May 29, 1986 [JP] Japan ................... 61-124538

[51] Int. Cl.$^4$ ............................................. G02B 26/08
[52] U.S. Cl. ...................................... 350/6.8; 350/6.5; 350/400
[58] Field of Search ............... 350/6.8, 6.5, 6.7, 400

[56] References Cited

U.S. PATENT DOCUMENTS 4,637,679 1/1987 Funato .......................... 350/6.5

Primary Examiner—Bruce Y. Arnold
Assistant Examiner—Terry S. Callaghan
Attorney, Agent, or Firm—Finnegan, Henderson, Farabow, Garrett, & Dunner

[57] ABSTRACT

A multi-beam scanning optical system of the present invention comprises a plurality of laser beam producing means, the producing means producing laser beams with their polarization directions parallel to one another, means for rotating the polarizing direction of at least one of the plurality of laser beams by 90 degrees, and a beam splitter means for superposing the plurality of laser beams on one another.

5 Claims, 2 Drawing Sheets

MULTI-BEAM SCANNING OPTICAL SYSTEM

BACKGROUND OF THE INVENTION

The present invention relates to a multi-beam scanning optical system.

In laser recording applications such as laser printers, scanning optical systems are employed in which the recording surface is scanned with a laser beam from a semiconductor laser after it is deflected by such a device as a rotating polygonal mirror or a hologram disk. In order to increase the recording speed of such apparatus, faster scanning may be effected by speeding up the rotation of the light deflector such as a rotating polygonal mirror or hologram disk. However, realization of higher rotating speeds requires a sophisticated and expensive bearings such as pneumatic or magnetic bearings and this leads to an increase in the cost of the apparatus.

To avoid this problem, a method has been developed that is capable of achieving a substantial increase in the scanning speed without increasing the rotational speed of the light deflector. In this method, a plurality of laser beams are simultaneously directed into the light deflector so as to achieve simultaneous scanning with a plurality of scanning lines.

A conventional optical system that employs this "multi-beam scanning" method is depected in FIG. 1. As shown in FIG. 1, the system comprises semiconductor lasers 1 and 2 as light sources, collimator lenses 3 and 4 that convert the radiation from the semiconductor lasers 1 and 2 into parallel rays of light, a polarized beam splitter 7 that superimposes the collimated laser beams 5 and 6, a rotating polygonal mirror 8 that allows the laser beams from the beam splitter 7 to be deflected with respect to a scanning surface 9, and an fθ lens 10 that receives the beams from the polygonal mirror 8 and focuses them to form spots of light on the scanning surface 9.

In this system, in order that a plurality of linearly polarized beams from the semiconductor lasers 1 and 2 can be superposed by the beam splitter 7, the two semiconductor lasers 1 and 2 are required to create S and P waves, respectively, with respect to the beam splitter 7. For this purpose, the semiconductor lasers 1 and 2 are positioned in such a manner that they are offset from each other by an azimuth angle of 90 degrees with respect to optical axes of the beams from the respective lasers. That is, the semiconductor lasers 1 and 2 are positioned such that the direction of the junction plane of the semiconductor laser 1 is perpendicular to the direction of the junction plane of the semiconductor laser 2. As a result, a direction of polarization of the beam produced by the semiconductor laser 1 is perpendicular to the direction of polarization of the beam from the laser 2, since the direction of polarization of the beam produced by a semiconductor laser is parallel with a direction of a junction plane of the semiconductor laser. For example, as shown in FIG. 1, the semiconductor laser 1 is placed such that the junction plane thereof is placed in parallel with the surface of the drawing. The semiconductor laser 2 is placed with its junction plane being perpendicular to the surface of the drawing. As a result, the vector of polarization of beam from the laser 1 is parallel with the surface of drawing, as indicated by arrow A in FIG. 1. On the other hand, the vector of polarization of beam from the laser 2 is perpendicular to the surface of the drawing, as indicated by arrow B.

The conventional system described above operates as follows. Radiation from the semiconductor lasers 1 and 2 is collimated by associated collimator lenses 3 and 4 to produce parallel rays of light which are then directed into the polarized beam splitter 7. Since the two laser beams are polarized perpendicular to each other, virtually all of the beam from the laser 1 is transmitted through the splitter 7 while the beam from the laser 2 is reflected almost completely. As a result, substantially no optical loss occurs in the two beams as they are superimposed in the beam splitter 7 to become aligned in substantially the same direction. The superimposed or aligned beams are then deflected by the rotational polygonal mirror 8 and passed through the fθ lens 10 to scan the scanning surface 9.

As described above, in the conventional multi-beam scanning optical system, the two semiconductor lasers which are intended to produce S and P waves are offset from each other by an azimuth angle of 90 degrees with respect to optical axes of the beam from the laser. The angle of spread of radiation from a semiconductor laser is different from each other in two directions, i.e., in the direction of polarization of the radiation and in the direction perpendicular to it, due to the emission distribution characteristics of the semiconductor laser itself. Therefore, in the conventional system, the beam spots 11 and 12 formed on the scanning surface by the beams from the semiconductor lasers 1 and 2 are different from each other in their shapes, as shown in FIG. 4. In this case, since two lines are scanned simultaneously with the two laser beam spots, the scanning speed can be increased. However, the two laser beams used for the simultaneous two-line scanning have angles of spread of radiation different from each other. Therefore, the resolution of the respective beams are different from each other. As a result, the above-described conventional multi-beam scanning optical system is unable to obtain a uniform or even picture.

In order to make the resolutions of the two beams equal to each other, the beams may be converted into beams having a circular cross section by the collimator lenses so that the beam spots 11 and 12 formed on the scanning surface may be in circular shape, as shown in FIG. 5. In this case, in a sub-scanning direction, i.e., in a laser spot scanning direction, data is recorded by elliptic beam spot. On the other hand, in a main scanning direction, i.e., in a data recording medium scanning direction, data is recorded by a circular beam spot. The conventional system using circularly shaped beam spots has a problem that an edge portion formed by the beam spots on the scanning surface is not made smooth, as shown in FIG. 5.

Therefore, it is preferable that the multi-beam scanning is performed such that the longitudinal direction 13 and 14 of the beam spots 11 and 12 coincide with the main scanning direction, i.e., the scanning surface moving direction, as shown in FIG. 6. However, for this purpose, in the conventional multi-beam scanning system, two types of collimator lenses, one for P wave and the other for S wave, are required, and this necessitates the use of more than one type of optical lenses.

SUMMARY OF THE INVENTION

An object of the present invention is to solve the aforementioned problems of the conventional multi-beam scanning optical system. More specifically, an object of the invention is to simplify the optical system by the use of a single type of collimator lenses.

According to the present invention, a multi-beam scanning optical system for simultaneous scanning with a plurality of laser beams comprises: a plurality of laser beam producing means, the producing means producing laser beams with their polarization directions parallel to one another; means for rotating the polarizing direction of at least one of the plurality of laser beams by 90 degrees; and a beam splitter means for superposing the plurality of laser beams on one another.

DETAILED DESCRIPTION OF THE PREFERRED EMBODIMENTS

Preferred embodiments of the present invention will be described with reference to the accompanying drawings.

Figure 1:
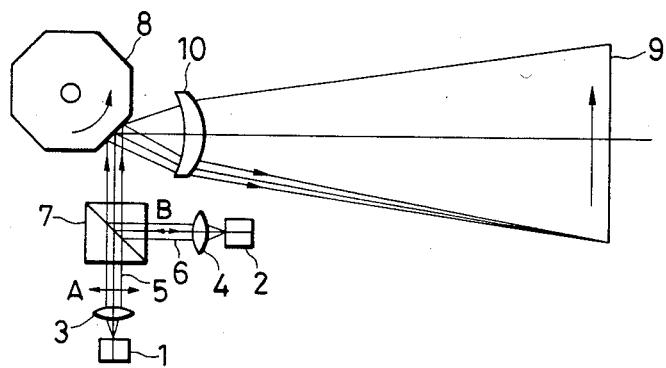
FIG. 1 shows diagrammatically the construction of a conventional multi-beam scanning optical system
Figure 2:
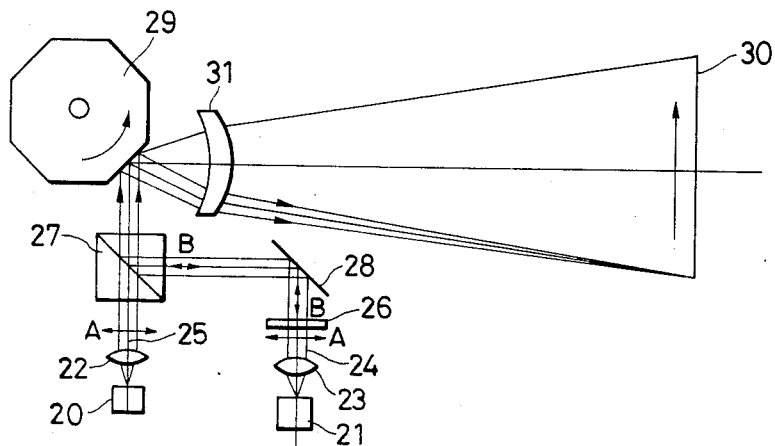
FIG. 2 shows diagrammatically the construction of the multi-beam scanning optical system of the present invention.

An embodiment of the multi-beam scanning optical system of the present invention is hereunder described with reference to FIG. 2. As shown in the FIG. 2, the system comprises semiconductor lasers 20 and 21 that produce rays of light having the same direction of polarization, collimator lenses 22 and 23 that convert the radiations from the two lasers 20 and 21 into parallel rays of light, a half-wavelength plate 26 that allows the polarization direction of the collimated laser beam from the collimated lens 23 to be rotated by 90 degrees, a plane mirror 28 that deflects a laser beam 24 from the half-wavelength plate 26, a polarized beam splitter 27 that superposes the deflected laser beam 24 and a collimated laser beam 25 from the collimator lens 22, a rotating polygonal mirror 29 that allows the laser beams from the beam splitter 27 to be deflected with respect to a scanning surface 30, and an fθ lens 31 that receives beams from the polygonal mirror 29 and forms spots of light on the scanning surface 30.

In the optical system according to the embodiment of the present invention described above, the semiconductor lasers 20 and 21 are placed such that the junction planes of the lasers 20 and 21 are parallel to each other. For example, as shown in FIG. 2, the semiconductor lasers 20 and 21 are placed such that the junction planes thereof both are parallel to the surface of the drawing. As a result, the polarization vectors of the beams produced from the respective lasers are parallel with each other, as indicated by arrows A in FIG. 2.

The multi-beam scanning optical system according to the embodiment of the present invention described above operates as follows. The laser beam 25 outputted from the semiconductor laser 20 is passed through the collimator lens 22 so that the beam 25 is converted into parallel beam that is introduced into the polarized beam splitter 27. Since the beam splitter 27 is positioned such that the beam from the laser 20 forms a p-polarized beam with respect to the beam splitter 27, virtually all of the laser beam 25 is transmitted through the beam splitter to reach the rotating polygonal mirror 29. The laser beam 25 is deflected by the polygonal mirror 29 and focused by the fθ lens 31 to form a spot of light that scans the scanning surface 30.

The laser beam 24 outputted from the semiconductor laser 21 is passed through the collimator lens 23 so that the beam 24 is converted into parallel beam. At this stage, the beam 24 forms a p-polarized beam with respect to the beam splitter 27, as in the case of the laser beam 25 from the laser 20. However, after emerging from the collimator lens 23 this P-wave laser beam 24 is passed through the half-wavelength plate 26 so that the direction of polarization of the beam is rotated by 90 degrees to form an s-polarized beam with respect to the beam splitter 27. The S-polarized laser beam 24 is reflected by the plane mirror 28 to be directed into the beam splitter 27 by which virtually all of the beam 24 is reflected in the direction of 90 degrees. The beam 24 is then superposed on the beam 25, so that the beams 24 and 25 are aligned in the same direction. The beams 24 and 25 aligned are directed to the polygonal mirror 29 to undergo deflection. The deflected beams 24 and 25 are focused by the fθ lens 31 to form spots of light to scan the scanning surface 30.

Figure 6:
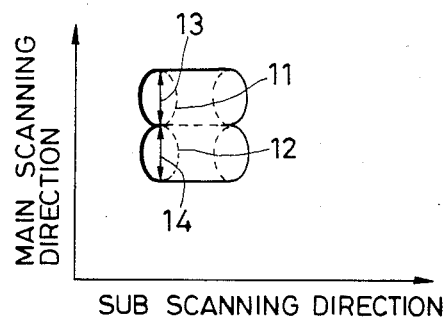

In the system of the present invention constructed as above, it is preferable that the respective semiconductor lasers 20 and 21 are arranged such that the longitudinal directions 13 and 14 of the beam spots 11 and 12 formed on the scanning surface coincide with the travelling direction of the data recording medium, as shown in FIG. 6. In order to arrange the beam spots on the scanning surface as shown in FIG. 6, the semiconductor lasers 20 and 21 are disposed such that a plane including the optical path of the beam 25 is parallel to and shifted from a plane including the optical path of the beam 24.

Figure 7A:
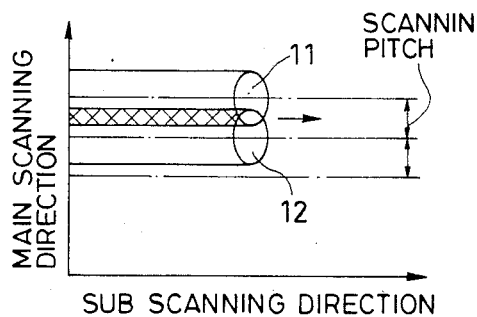
FIGS. 7a and 7b schematically illustrate shapes of beam spots formed on the scanning surface by the multi-beam scanning optical system of the present invention of FIG. 2.
Figure 7B:
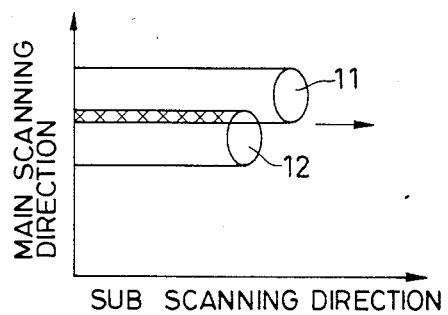

In the above-described system, as shown in FIG. 6, the diameter of the beam spot in its longitudinal direction is selected to be equal to the pitch or interval of the scanning lines of the beams so that the beam spots do not overlap each other. Therefore, it may occur that light intensity is low at portions where the beam spots contact each other. As a result, in the picture obtained by the system, there may occur structure lines at portions where the beam spots contact each other, that is, with an interval equal to the scanning pitch. To avoid this problem, it is preferable that the diameter of the beam spot in its longitudinal direction is set to be larger than the scanning pitch of the beams so that the loci of the beam spots partially overlap each other, as shown in FIG. 7a. As a result, it makes possible to prevent such structure lines as described above from occurring on the picture obtained, to thereby obtain a good and satisfactory picture. Furthermore, in this case, even where the scanning timing of the beams are shifted from each other as shown in FIG. 7b, since scanning loci of the beam spots overlap each other partially, a good and satisfactory picture can be certainly obtained.

The diameter of the beam spot can be arranged as follows: In the scanning system of the present invention as shown in FIG. 2, the beam spot diameter d on the scanning surface, the focal length f of the fθ lens 31 and the diameter D of the cross section of the incident beam into the fθ lens 31 satisfy the equation $d=4\lambda f/4D$, where λ is a wavelength of the beam. Therefore, the diameter of the beam spot can be freely selected, by changing the diameter of the incident beam into the fθ lens 31 and the fθ lens 31.

The diameter of the beam spot changes also in accordance with the light sensitivity of the scanning surface. However, it is preferable that the diameter of the beam spot in its longitudinal direction is 1.1 to 3.0 times as large as the scanning pitch of the beams. More preferably, the diameter of the beam spot in its longitudinal direction is 1.5 to 2.0 times as large as the scanning pitch.

For example, in the case where a resolution of 700 spi (spot per inch) is to be obtained, if the diameter of the beam spot in its longitudinal direction is set to be 35 to 70 μm, the value is in the above-described range. As a result, the structure lines are not produced in the picture obtained, so that it makes possible to obtain a good and satisfactory picture.

Figure 3:
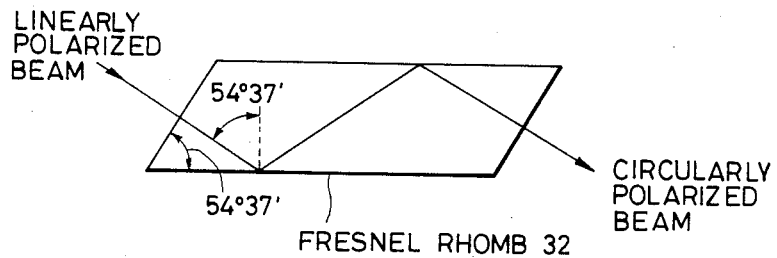
FIG. 3 illustrates one example of a Fresnel rhomb applicable to the multi-beam scanning optical system of FIG. 2.
Figure 4:
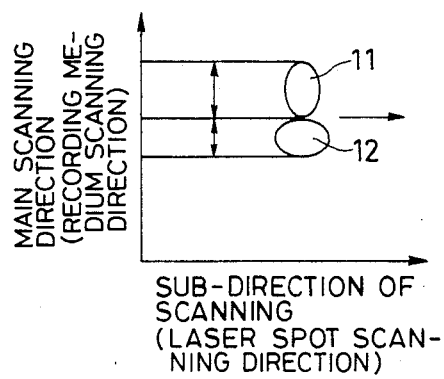
FIG. 4 schematically illustrates shapes of beam spots formed on the scanning surface by the conventional multi-beam scanning optical system of FIG. 1.
Figure 5:
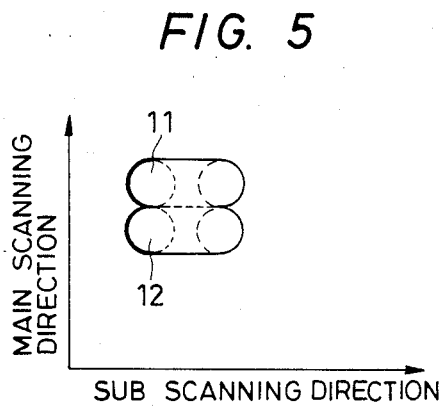
FIGS. 5 and 6 schematically illustrate examples of shapes of beam spots formed on the scanning surface.

In the embodiment described above, the direction of polarization of laser beam is rotated by 90 degrees with a half-wavelength plate but any other optical device such as a Fresnel rhomb that is capable of achieving 90 degrees rotation of the polarizing direction of the beam may be substituted. The Fresnel rhomb is a rhombic prism made of glass. A beam entered in the Fresnel rhomb undergoes total internal reflections two times inside the Fresnel rhomb, as a result of which a phase difference of 90 degrees is produced between a p-polarized component and an s-polarized component of the beam. For example, in the case where the refractive index of the glass is 1.51, as shown in FIG. 3, when a linearly polarized beam enters the Fresnel rhomb 32 with its polarization direction forming an azimuth angle of 45 degrees with respect to the incident surface of the rhomb and reflects at the total internal reflecting surface with its incident angle of 54° 37', the beam emerging out from the rhomb is changed into a circularly polarized beam.

As described in the foregoing, according to the multibeam scanning optical system of the present invention, the direction of light polarization is rotated by 90 degrees with a half-wavelength plate that is inserted in the optical path of one or more of a plurality of laser beams having the same direction of polarization. This affords the advantage of simplifying the optical system because of the use of only one type of collimator lenses.

Various modifications and variations could be made in the invention without departing from the scope or spirit of the invention.

What is claimed is:

1. A multibeam scanning optical system for simultaneous scanning with a plurality of laser beams of a scanning surface, comprising:
    a plurality of semiconductor lasers each emitting a beam of laser radiation, said beams of laser radiation having planes of polarization parallel to each other and each of said beams of laser radiation having a major axis perpendicular to its direction of polarization;
    means for collimating each of said plurality of laser beams;
    means for rotating the polarization direction of at least one of said plurality of laser beams by 90°;
    means for arranging said plurality of laser beams such that said beams define a scanning pitch on said scanning surface;
    means for directing said plurality of laser beams to the scanning surface; and
    means for imaging said arranged beams as beam spots onto said scanning surface.

2. A multi-beam scanning optical system according to claim 1, wherein said means for rotating the polarizing direction of said laser beams by 90 degrees comprises a half-wavelength plate.

3. A multi-beam scanning optical system according to claim 2, wherein the diameter of each beam spot in its longitudinal direction formed on the scanning surface is set to be larger than the scanning pitch of the beams so that the scanning loci of the respective beam spots partially overlap each other.

4. A multi-beam scanning optical system according to claim 3, wherein the diameter of each beam spot in its longitudinal direction formed on the scanning surface is set to be 1.1 to 3.0 times as large as the scanning pitch.

5. A multi-beam scanning optical system according to claim 4, wherein the diameter of each beam spot in its longitudinal direction formed on the scanning surface is set to be 1.5 to 2.0 times as large as the scanning pitch.

* * * * *